United States Patent [19]
Kehm

[11] 3,929,032
[45] Dec. 30, 1975

[54] TRANSMISSION ASSEMBLY
[75] Inventor: Paul H. Kehm, Ambler, Pa.
[73] Assignee: Teleflex Incorporated, North Wales, Pa.
[22] Filed: Jan. 6, 1975
[21] Appl. No.: 538,870

Related U.S. Application Data
[62] Division of Ser. No. 394,358, Sept. 4, 1973, Pat. No. 3,884,449.

[52] U.S. Cl............... 74/501 R; 74/501 P; 251/294
[51] Int. Cl.² ........................................... F16C 1/10
[58] Field of Search ........ 74/501 R, 501 P; 251/294

[56] References Cited
UNITED STATES PATENTS
3,885,770   5/1975   Houk.................................. 251/294

Primary Examiner—Samuel Scott
Assistant Examiner—Frank H. McKenzie, Jr.
Attorney, Agent, or Firm—McGlynn and Milton

[57] ABSTRACT

A modulator valve control for an automatic transmission to provide an input which determines the shift point at which the transmission changes from one mode to another. The assembly includes a modulator valve having a plunger extending therefrom and into a housing. A motion transmitting remote control is included and comprises a guide means attached to the housing and a flexible motion transmitting core element movably supported by the guide means and connected to a wheel which is in turn rotatably supported on a shaft in the housing. A flat spiral spring interconnects the wheel and the plunger of the modulator valve for actuating the modulator valve in response to motion of the core element.

2 Claims, 3 Drawing Figures

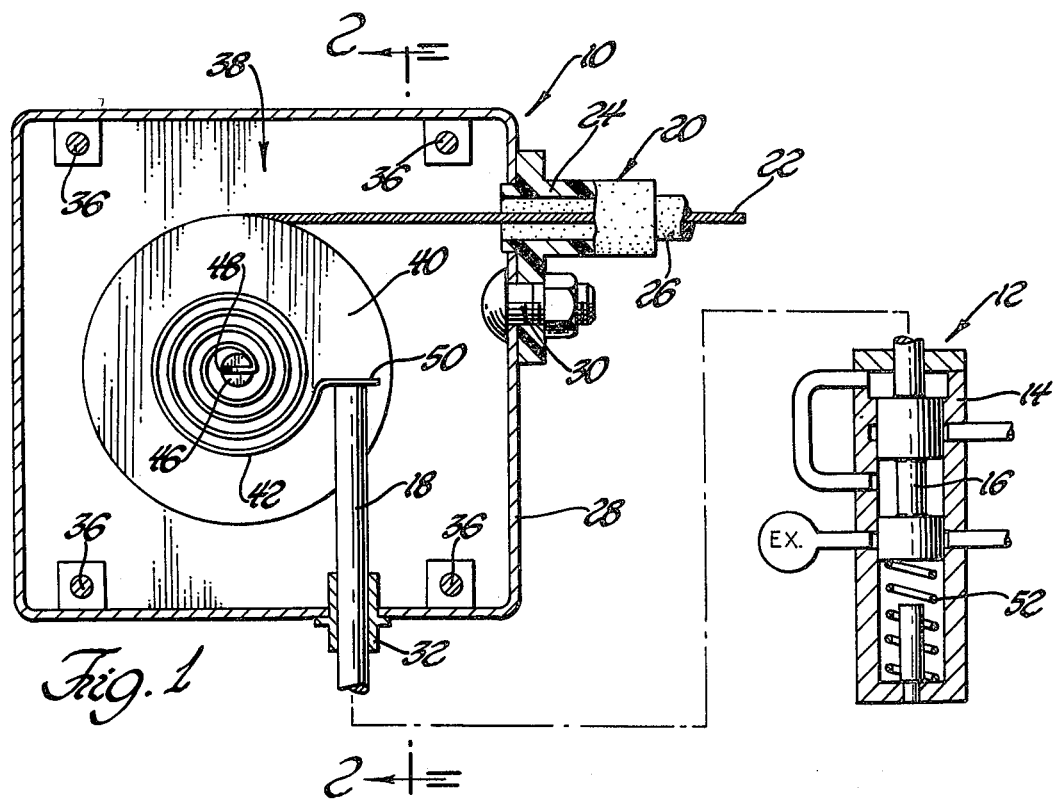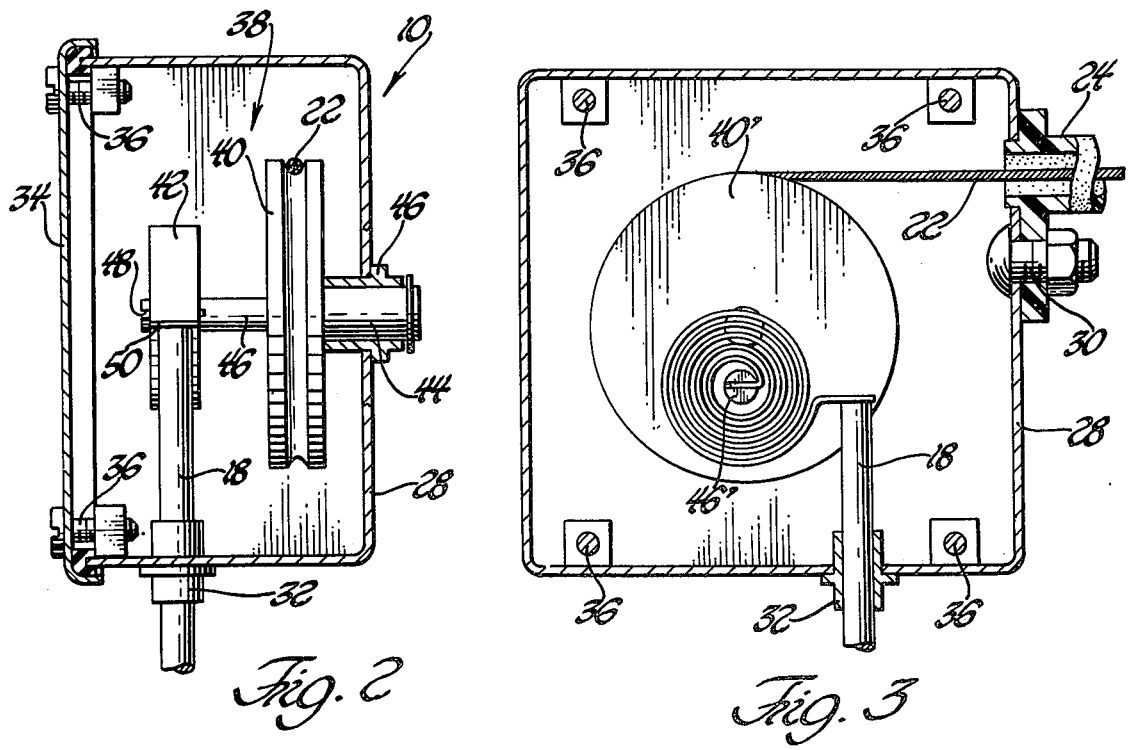

TRANSMISSION ASSEMBLY

This application is a divisional of application Ser. No. 394,358, filed Sept. 4, 1973 now U.S. Pat. No. 3,884,449.

The subject invention relates to an automatic transmission of the type utilized in automotive vehicles and more particularly to the type including a modulator valve which receives an input to control or determine a shift point in the automatic transmission, the shift point being the point at which the transmission changes from one mode to another.

In a normal automatic transmission the transmission automatically shifts in response to various inputs to the transmission. Normally all shifts within the transmission are modulated according to the position of the throttle. This is accomplished through a modulator valve in the transmission which is moved in response to the position of the throttle. Most frequently this is accomplished by making the position of the modulator valve responsive to the engine manifold vacuum which is proportional to the throttle opening.

There are mechanical assemblies utilized to interconnect the modulator valve and the throttle linkage. In one basic system a push-pull remote control system is utilized wherein a movable core element is actuated by the throttle linkage and moves a linear ramp or cam, or the like, which in turn moves a plunger of the modulator valve. In such a system, however, the push-pull control must be capable of transmitting both tension and compression forces, which results in inefficiency, expense and a number of components.

In an exemplary automotive set-up the throttle linkage may travel 1 ½ while the modulator valve does not move until 12 pounds of force is applied thereto and ends its movement when 16 pounds of force is applied thereto. However, during the first ¾ of travel of the throttle linkage there should be no movement of the modulator valve and the force being applied thereto should be building up to 12 pounds so that it reaches 12 pounds when the throttle has moved ¾ inch. Thus, there is a requirement for a lost motion between the throttle linkage and the modulator valve. Additionally, when the throttle has reached its full movement a given force, such as 16 pounds in the above example, should be applied to the modulator valve.

Thus, in accordance with the instant invention there is provided a very simple and uncomplex, yet reliable system for interconnecting the throttle linkage and the modulator valve in an automotive vehicle. This is accomplished by utilizing a motion transmitting remote control including a guide means movably supporting a core element which need only to transmit forces in tension and is connected to the modulator valve through a biasing means which returns the core element to the initial position after the tension forces are removed therefrom.

Other features and attendant advantages of the present invention will be readily appreciated as the same becomes better understood by reference to the following detailed description when considered in connection with the accompanying drawings wherein:

FIG. 1 is a cross-sectional view of a preferred embodiment of the instant invention;

FIG. 2 is a cross-sectional view taken substantially along line 2—2 of FIG. 1; and FIG. 3 is a view similar to FIG. 1 but showing an alternative embodiment of the subject invention.

Referring now to the drawings, a transmission assembly constructed in accordance with the instant invention is generally shown at 10.

The assembly 10 includes a modulator valve generally shown at 12. The modulator valve 12 forms a part of the fluid circuit in an automatic transmission of any well known type and, therefore, the entire transmission need not be shown. A typical transmission including such a modulator valve is shown in FIG. 13 of an article entitled "New Automatic Transmission for Off-Highway Vehicles" set forth in pages 21 through 28 of the April 1973 issue of AUTOMOTIVE ENGINEERING (Volume 81, No. 4).

The modulator valve 12 comprises a valve housing 14 and spool valve 16. A plunger 18 acts against the spool valve 16 to move the spool valve to control fluid flow through various ports extending through the valve housing 14. The plunger 18 may be integral with or merely abut the spool 16.

The assembly 10 also includes a motion transmitting remote control including a guide means generally indicated at 20 and a flexible motion transmitting core element 22. The guide means 20 typically includes a rigid plastic fitting 24 secured to the end of a flexible conduit 26 as by fusion bonding. The conduit 26 is preferably made of plastic and may include an inner tubular member with helically wound filaments or wires disposed about the inner tubular member and a plastic jacket extruded about the wires and the inner tubular member. The core element 22 is of the type which is capable of transmitting forces when placed in tension but need not transmit forces when placed in compression. The cable 22 may be stranded as illustrated or may be made of a single wire.

A housing 28 is included and the fitting 24 is secured to the housing 28 by a bolt 30. The plunger 18 extends into the housing 28 through a sleeve or bushing 32. The housing 28 includes a cap or cover 34 which is held in place by the bolts 36.

The assembly 10 also includes a biasing means, generally shown at 38, operatively interconnecting the core element 22 and the plunger 18 of the modulator valve 12 for moving the spool 16 of the valve 12 in response to movement of the core element 22 from a neutral position when placed in tension and for returning the core element 22 to the neutral position when the tension forces are removed from the core element 22. Further, the biasing means 38 may be described as a lever means operatively interconnecting the core element 22 and the plunger 18 of the modulator valve 12 for obtaining a mechanical advantage from the force delivered by the core element 22 for actuating the modulator valve 12. The biasing means or lever means 38 includes a wheel 40 and a flat spring 42. The wheel 40 is supported on a shaft 44 which is rotatably supported in a sleeve or bushing 46 in the housing 28. The core element 22 extends about the wheel 40 and has its end secured thereto. Thus, when a tension force is placed upon the core element 22 to move the core element 22 to the right, as viewed in FIG. 1, the wheel 40 will rotate in the clockwise direction.

The spring 42 comprises a flat spring wound in a spiral. A rod or shaft 46 extends from the wheel 40 coaxially with the axis of rotation of the wheel 40 and includes a slot 48 in the end thereof. The central end portion of the spiral spring 42 is disposed in the slot 48. The radially outward end 50 of the spiral spring engages the plunger 18 of the modulating valve 12.

In operation, the core element 22 is placed in tension to rotate the wheel 40 in a clockwise direction. Upon rotation of the wheel 40, the spiral spring 42 winds up to increase the force upon the plunger 18. In accordance with the example given above, the force applied to the plunger 18 through the spring 42 builds up to approximately 12 pounds before the plunger 18 moves. Therefore, the spring 42 provides the lost motion between the core element 22 and the plunger 18 of the modulator valve 12. The spring 42 also acts as a torque converter. Once the designated force is applied to the plunger 18 the spool 16 moves against the action or force of spring 52, whereby fluid flow through the modulating valve 12 is controlled to provide an input to the transmission to effect control of the shifting of the transmission from one mode to another. When the throttle linkage is returned, the tension force upon the core element 22 is removed and the spiral spring 42 rotates the wheel 40 in the counterclockwise direction to return the core element 22 to the neutral position.

The embodiment shown in Fig. 3 differs from the embodiment of Figs. 1 and 2 by the position of the rod 46'. The rod 46', instead of being coaxial with the axis of rotation of the wheel 40', is attached to the wheel 40' eccentrically of the axis of rotation of the wheel 40'. By placing the center of the spiral spring eccentrically to the axis of rotation of the wheel 40' the force supplied to the plunger 18 through the spring is nonlinear to the force supplied to the wheel 40' by the core element 22.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An actuating assembly comprising: a member to be actuated, a motion transmitting remote control including guide means and a flexible motion transmitting core element movably supported by said guide means, and a flat flexible spring interconnecting said core element and said member for moving said member in response to movement of said core element.

2. An assembly as set forth in claim 1 wherein said core element is tension bearing and is returned to a neutral position by said spring when the tension force is removed therefrom.

* * * * *